April 23, 1968     W. H. DUDAR     3,380,021
TIRE PRESSURE AND WHEEL BEARING TEMPERATURE INDICATOR
Filed Jan. 28, 1965     3 Sheets-Sheet 1

INVENTOR.
WALTER H. DUDAR
BY *Alfred W Petchaft*
ATTORNEY

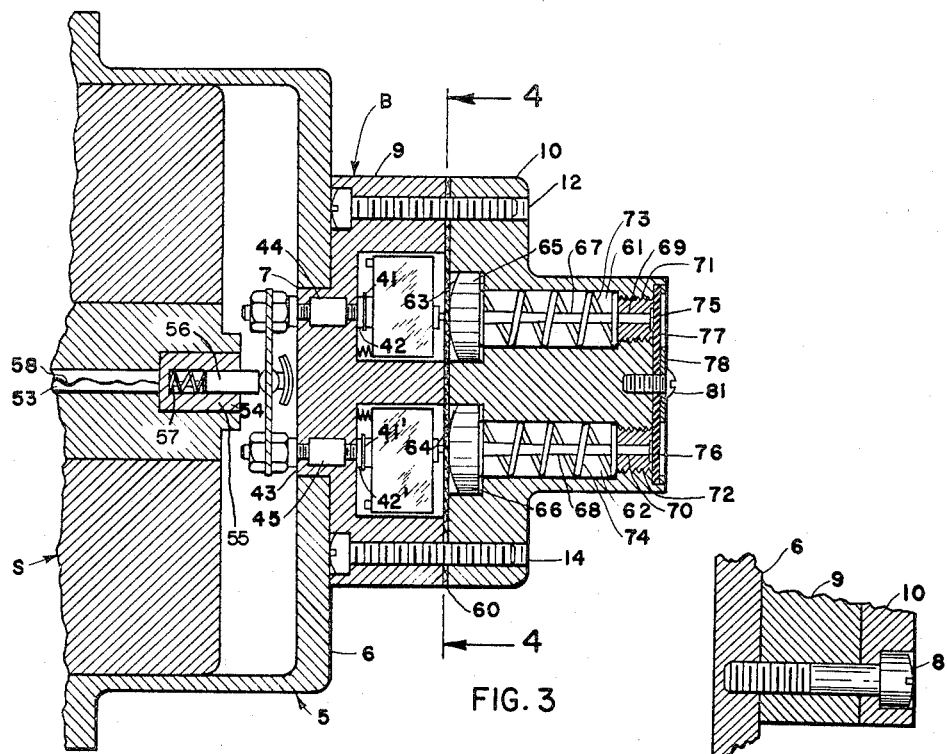
FIG. 3
FIG. 5
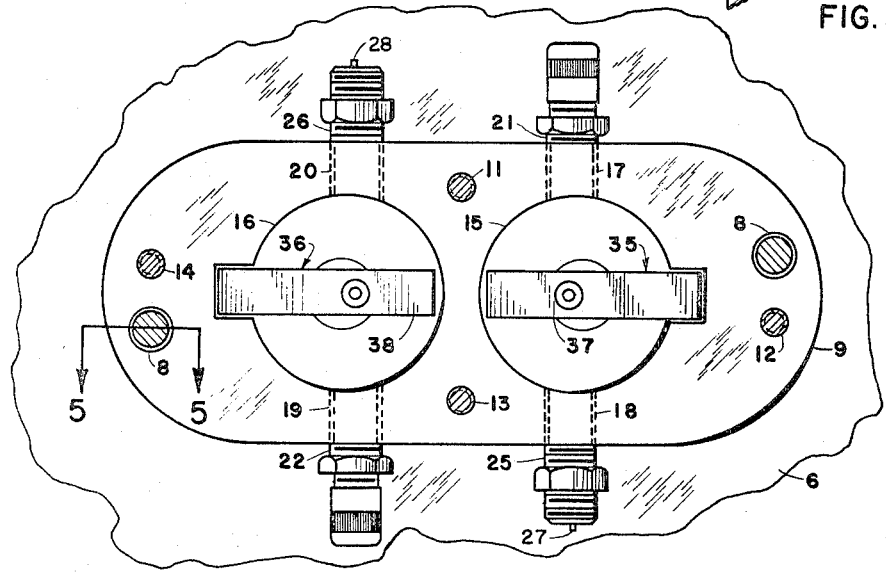
FIG. 4
INVENTOR.
WALTER H. DUDAR
BY
ATTORNEY

April 23, 1968 W. H. DUDAR 3,380,021
TIRE PRESSURE AND WHEEL BEARING TEMPERATURE INDICATOR
Filed Jan. 28, 1965 3 Sheets-Sheet 3

INVENTOR.
WALTER H. DUDAR
BY
ATTORNEY

United States Patent Office 3,380,021
Patented Apr. 23, 1968

3,380,021
TIRE PRESSURE AND WHEEL BEARING
TEMPERATURE INDICATOR
Walter H. Dudar, Dallas, Tex., assignor to Tel-Air Corporation, Dallas, Tex., a corporation of Texas
Filed Jan. 28, 1965, Ser. No. 428,692
5 Claims. (Cl. 340—58)

ABSTRACT OF THE DISCLOSURE

A warning device including a split housing mounted on the hub of a vehicular wheel and having a pair of internal cavities which are divided by a diaphragm. One side of each cavity contains a pressure-responsive switch connected to a tire, while the other side contains a shiftable plug which is urged against the diaphragm by a spring acting in opposition to the force exerted by the pressurized air thereon. Adjusting screws bear against the opposite ends of the springs so that the force exerted by the spring on the diaphragm can be altered. Rod-like elements extend from the plugs through the adjusting screws so that the pressure-responsive switch can be manually operated. A contactor plate is mounted on the housing adjacent the end face of the spindle and a bi-metallic blade is mounted on it for grounding the contactor plate to the housing at a predetermined temperature. An axially extending brush projects centrally from the spindle and bears against the plate and the brush is connected to a light in the cab to indicate when either the pressure-responive switch or blade is closed.

---

This invention relates in general to new and useful improvements in tire pressure and wheel bearing temperature indicators and, more particularly, to a monitoring system for giving an auditory or visual warning when tire pressure in a vehicle tire drops below a desired level and additionally warning of overheated wheel bearings in the same vehicle.

The operators of commercial vehicles such as hauling companies, motor-carriers, and the like have long been troubled by the expense of tire-maintenance and tire-replacement. In large modern trucks, it is often difficult or impossible to detect a low-pressure condition in tires until the tire has been irreparably damaged. Some large interstate tractor-trailer units may have as many as ten wheel-bearings and eighteen tires which should be continuously monitored as to wheel-bearing temperature and tire pressure. The driver should inspect all tires and wheel bearings before starting a run and at every stop during a run. In addition, it is desirable that the driver know the temperature condition of the wheel-bearings and the inflation-condition of the tires at all times while the vehicle is traveling.

It is, therefore, the primary object of the present invention to provide a monitoring system and an indicator for use therein which will maintain continual surveillance over the temperature of the wheel bearings and the air-pressure in the tires of a motor vehicle.

It is an additional object of the present invention to permit the inspection and, if necessary, the inflation of a tire in a simple and convenient manner.

It is a further object of the present invention to provide a substantially instantaneous warning of a drop in air pressure within any tire or overheating of any wheel-bearing while the vehicle is in motion.

It is also an object of the present invention to provide a device of the type stated which is compact, rugged and economical.

With the above and other objects in view, my invention resides in the novel features of form, construction, arrangement, and combination of parts presently described and pointed out in the claims.

In the accompanying drawings—

FIG. 1 is a side elevational view showing a dual wheel and tire assembly with a tire pressure and temperature indicator constructed in accordance with and embodying the present invention;

FIGS. 2 and 3 are fragmentary sectional views taken along lines 2—2 and 3—3 respectively of FIG. 1;

FIG. 4 is a fragmentary sectional view taken along line 4—4 of FIG. 3;

FIG. 5 is a fragmentary sectional view taken along line 5—5 of FIG. 4;

Figure 1:
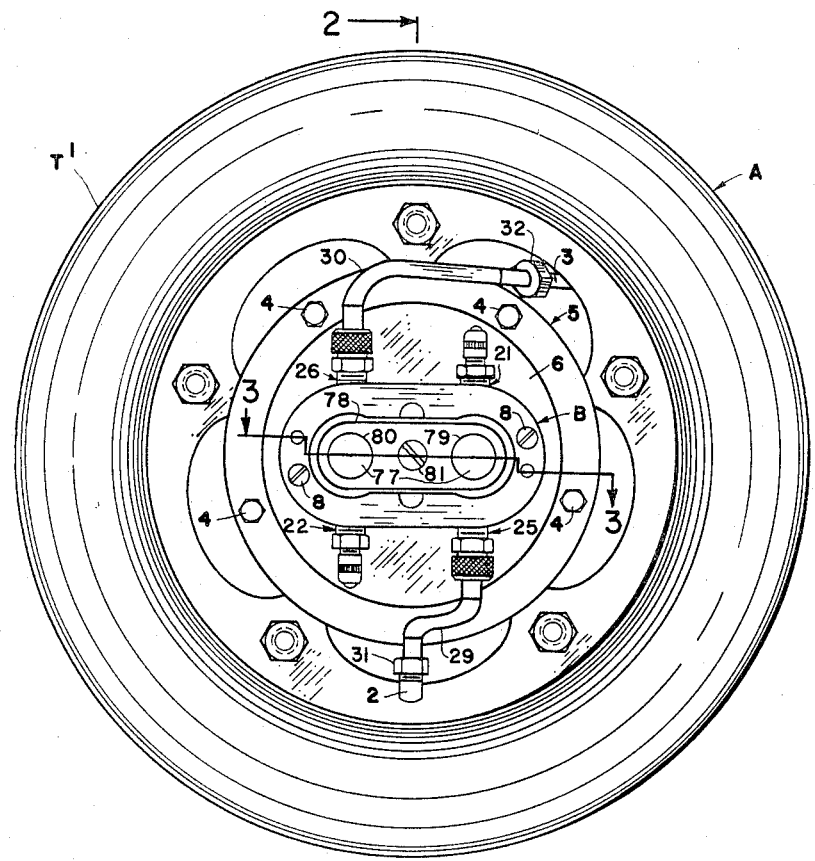
Figure 2:
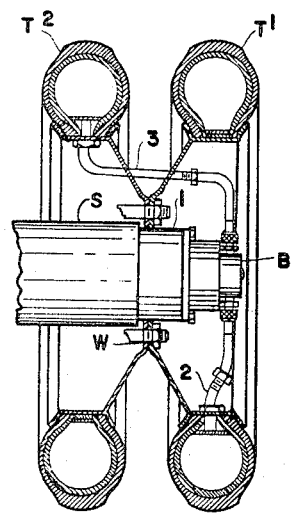
Figure 8:
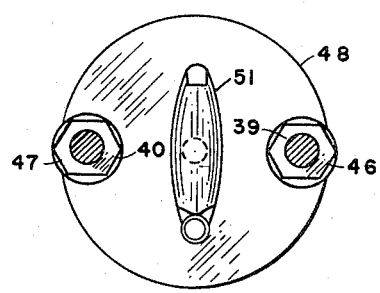
FIG. 8 is a fragmentary sectional view taken along line 8—8 of FIG. 7.
Figure 6:
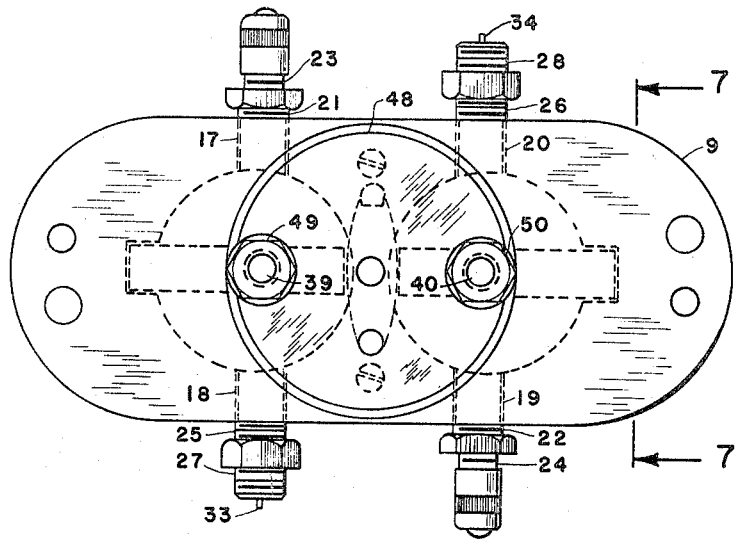
FIG. 6 is a rear elevational view of the tire pressure and temperature indicator prior to installation in the hub cap.

Referring now in more detail and by reference characters to the drawings which illustrate a preferred embodiment of the present invention, A designates a dual wheel assembly comprising tires $T^1$ and $T^2$ and a dual wheel W mounted in a conventional manner upon a hub 1 which is, in turn, mounted in a conventional manner upon an axle (not shown). The tires $T^1$ and $T^2$ are respectively provided with conventional valve stems 2, 3. Secured to the hub 1 by means of bolts 4, is a cylindrical hub cap 5 having a flat circular end wall 6, provided with a large central aperture 7.

Mounted upon the external face of the circular end wall 6, by means of bolts 8, is a sensing unit B comprising an elliptical base member 9 and an outer cap member 10, secured together by means of bolts 11, 12, 13, 14 to form a housing. The base member 9 is formed with spaced cylindrical chambers 15, 16 and extending radially outwardly from the chamber 15 are passageways 17, 18, and similarly extending outwardly from the chamber 16, are passageways 19, 20, said passageways 17, 18, 19, 20 terminating at the outer periphery of the base member 9, and being internally threaded for a substantial distance inwardly from such outer ends. Threaded into and projecting outwardly from the passageways 17 and 19, are nipples 21, 22, respectively, which are internally provided with valve cores which are of conventional construction and are, therefore, not shown or described in detail. It is sufficient for present purposes to note that the nipples 21, 22 and valve cores are used for inflating the tires $T^1$, $T^2$, respectively. Similarly threaded into and projecting outwardly from the passageways 18 and 20, are externally threaded nipples 25, 26, having internal valve-stem operating pin tubes 27, 28, and being respectively connected by flexible air-hoses 29, 30, to the valve stems 2,3. As a matter of safety precaution, the air-hoses 29, 30, are trapped at one end with conventional valve cores and at the other end, valve-stem operating pin-tubes.

Mounted within the chambers 15, 16, are highly sensitive microswitches 35, 36, having plastic dielectric bodies 37, 38, and terminal stems 39, 40, the latter being insulated from the body of the base member 9 by means of fiber washers 41, 41', and O-rings 42, 42', respectively. The terminal stems 39, 40, are threaded at their outer ends and project through the rear wall 43, being insulated therefrom by short dielectric sleeves 44, 45, and being secured to the base member 9 by nuts 46, 47. Mounted on and extending between the outer end of the stems 39, 40, is a circular brass disk or contactor plate 48 which is held in place by nuts 49, 50. Riveted or otherwise fixed at one end to the under face of the disk 48 is an elliptically shaped bi-metallic blade 51 which is dished or cupped so that upon being subjected to temperature rise, the blade 51 will snap from the position shown in full lines to the position shown in dotted lines in FIG. 5. At the outer end of its major axis, the bi-metallic blade 51 is provided with a contact point 52.

Figure 7:
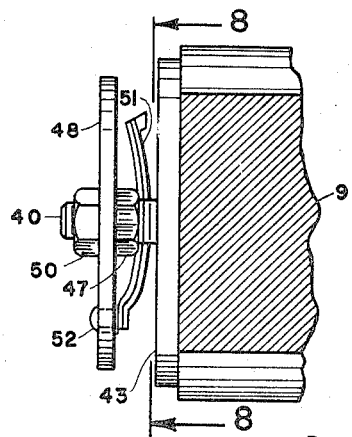
FIG. 7 is a fragmentary sectional view taken along line 7—7 of FIG. 6.
Figure 9:
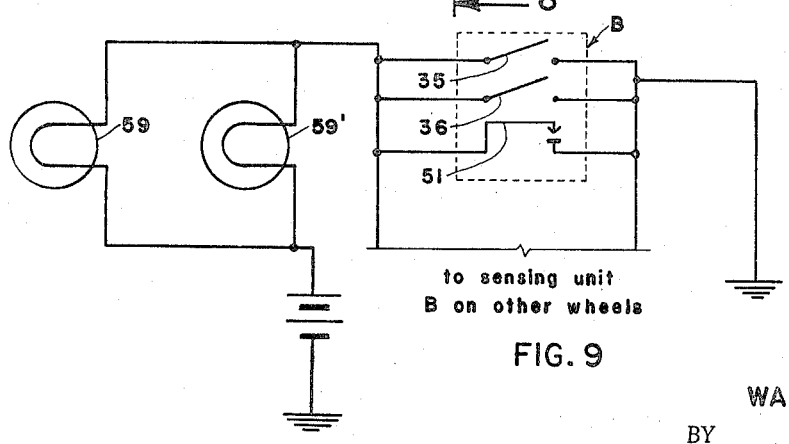
FIG. 9 is a schematic wiring diagram of the electrical circuit forming part of the present invention.

The hub 1 is conventionally mounted upon an axle spindle S provided with a concentric bore 53 which terminates in its outer end in a diametrally enlarged portion 54, adapted to receive an insulating sleeve 55. The sleeve 55 is also centrally bored for holding a brush 56 and a compression spring 57 by which the outer end of the brush 56 is resiliently held in contact with the brass disk 48. Connected to the inner end of the brush 56 and extending along the bore 53 is a lead wire 58 which is, in turn, connected to a warning light 59 on the truck dashboard and an auxiliary light 59' mounted in a visible location on the underside of the truck-body as schematically shown in FIG. 7.

Marginally held between the base member 9 and the cap member 10 is a primary rubber diaphragm 60 which is of the same peripheral shape as the base member 9 and cap member 10. The cap member 10 is provided with spaced parallel bores 61, 62, which are, in turn, counter-bored in the provision of shallow circular recesses 63, 64, which are coaxial with the chambers 15, 16. Shiftably disposed within the recesses 63, 64, are plunger-like plugs 65, 66, the outer surfaces of which are dome-shaped and bear operatively against the diaphragm 60, as shown in FIG. 4. On their opposite ends, the plugs 65, 66, are integrally provided with axial rod-like elements 67, 68, which are adapted for endwise abutment against push-pins 69, 70. At their outer ends the bores 61, 62, are internally threaded for accommodating tubular adjusting screws 71, 72, which bear against the outer ends of compression springs 73, 74, thereby biasing the plugs 65, 66, against the diaphragm 60. At their outer ends, the push-pins 69, 70, are diametrally enlarged and seated within counter-bores 75, 76, in the tubular adjusting screws 71, 72, and bear endwise against a secondary rubber diaphragm 77. The diaphragm 77 is, in turn, held by an elliptically shaped metal disk 78 having circular openings 79, 80, which register with the bores 61, 62, respectively. The metal disk 78 is attached to the outer end of the cap member 10 by a screw 81.

In use, the tires $T^1$, $T^2$, are filled through the nipples 21, 22, to the desired operating pressure. Since the chambers 15, 16, communicate with the tires $T^1$, $T^2$, through passageways 18 and 20, the pressure in each of the chambers 15, 16, will be the same as that in each of the tires $T^1$, $T^2$. Moreover, the pressure in each chamber 15, 16, will force the primary diaphragm 60 outwardly against the plugs 65, 66, and the springs 73, 74. The adjusting screws 71, 72, may then be rotated so as to cause the springs 73, 74, to urge the plugs 65, 66, against the primary rubber diaphragm 60 in opposition to the pressure in the chambers 15, 16. Upon continued rotation of the adjusting screws 71, 72, the primary rubber diaphragm 60 will be forced by the plugs 65, 66, against the microswitches 35, 36, thereby closing the circuit and illuminating the warning light 59 on the instrument panel in the cab and the auxiliary light 59'. The adjusting screws 71, 72, may then be backed off in amounts sufficient to release the pressure of the plugs 65, 66, against the primary diaphragm 60, and just barely allow the microswitches 35, 36, to open and break circuit, shutting off the warning light 59. By this means, the sensing unit B can be set for any desired tire-pressure. Should the tire $T^1$ be punctured or otherwise suffer any reduction in pressure, the pressure in chamber 15 will be correspondingly reduced, whereupon the compression spring 73 will urge the plug 65 against the primary diaphragm 60, thereby closing the microswitch 35 and illuminating the warning light 59.

In normal operation, the pressure in tires $T^1$, $T^2$, will be sufficient to overcome the force of compression springs 73, 74, thereby causing the rod-like elements 67, 68, to abut against the inner end of push-pins 69, 70, which will correspondingly cause bulges in the secondary diaphragm 77 to extend outwardly through openings 79, 80, in the metal disk 78. Since the wheel-bearings are cool, the blade 51 will also be in "off" position. Of course, if a tire is definitely "low" or the bearing temperature is elevated, the corresponding light will be lit.

The driver of the vehicle may test the circuits and the inflation of the tires by manually depresing the aforesaid bulge causing the plugs 65, 66, to shift inwardly against the primary diaphragm 60, thereby closing microswitches 35, 36, and illuminating warning lights 59, 59'. The compression springs 73, 74, are designed and selected so that some appreciable additional increment of force, a so-called inherent reaction lag over the set air pressure is required to move the plugs 65, 66. If, for example, the tires have a factory-recommended optimum operating pressure of 75 p.s.i. and the inherent reaction lag of the springs 73, 74, is 5 p.s.i., the springs 73, 74, will be backed off and the signal thus set for 75 p.s.i., but springs 73, 74 will not react until the pressures in the tire drops to 70 p.s.i. In other words, there is a 5 pound pressure lag in the springs 73, 74, so that a signal wil not automatically be given as long as the tire pressure is in the range of 70–75 p.s.i. Most truck tires are safely operable within about 5 p.s.i. of optimum pressure and therefore a driver would not need a "danger" signal as long as the tire pressure was within this range. However, when the driver of the vehicle manually pushes against the bulges and shifts the push-pins 69, 70, inwardly, the plugs 65, 66, and the microswitches 35, 36, will be moved into "on" position. If the pressure in the tires $T^1$, $T^2$, and in the chambers 15, 16, is in excess of the set pressure, the lights 59, 59', will go "off" as soon as manual pressure is removed. On the other hand, if one or more of the tires is "low," the lights 59, 59', will remain lit and the driver can test the tires with a conventional pressure gauge. Since the springs 73, 74, have the 5 pound reaction lag, the lights 59, 59' will stay on even if the tire pressure is within the marginal 70–75 p.s.i. range.

If, when the vehicle is moving, a tire should become under inflated, the lights 59, 59', will light up. Similarly, if a wheel-bearing becomes hot, the bi-metallic blade 51 will flex with a snap-action at the temperature for which it is designed, thereby causing contact point 52 to make contact with the inner face of base member 9, thus completing the circuit and illuminating warning lights 59, 59'. Whenever this occurs, the driver will stop the vehicle and inspect the tires and wheel-bearings. Usually under such conditions, the driver will send for a repair truck and will not risk further travel until proper repairs are made.

It should be understood that changes and modifications in the form, construction, arrangement, and combination of the several parts of the tire pressure and wheel bearing temperature indicator may be made and substituted for those herein shown and described without departing from the nature and principle of my invention.

Having thus described my invention, what I claim and desire to secure by Letters Patent is:

1. For use with a vehicular wheel mounted on a hub which is in turn bearing-mounted on a spindle; a warning device comprising a contactor element mounted for rotation with the hub but electrically isolated therefrom, a bi-metallic element mounted for rotation with the hub and adapted to ground the contactor element to the hub at a predetermined temperature, electrically operable indicia means remote from the spindle and wheel, and electrical conduit means extending through the spindle for electrically connecting the contactor element to the indicia means.

2. For use with a vehicular wheel provided with a pneumatic tire and mounted on a hub which is in turn bearing-mounted on a spindle; a warning device comprising a housing mounted on the hub for rotation therewith and provided with an internal cavity, a flexible diaphragm extending across the cavity so as to divide it into a chamber and a recess, conduit means interconnecting the tire with the chamber so that the pressure of the air within the chamber is the same as that in the tire, a spring carried by the housing and acting upon the diaphragm in opposition to the force exerted thereon by the pressurized air within the chamber, a pressure-responsive switch carried by the housing and being in engagement with the diaphragm, the switch being adapted to move between a closed position and an open position in response to movement of the diaphragm, and a temperature-responsive switch mounted on the housing and connected in parallel with the pressure-responsive switch, the temperature-responsive switch being adapted to close at a predetermined temperature.

3. A warning device according to claim 2 wherein the temperature-responsive switch comprises a contactor plate rigidly mounted on the housing in spaced relation from the external surface thereof and being electrically isolated from the housing, and a bi-metallic blade interposed between the contactor plate and housing and adapted to ground the plate to the housing at the predetermined temperature.

4. A warning device according to claim 3 wherein the contactor plate is located adjacent the end face of the spindle; wherein the housing and hub shield the blade from the surrounding atmosphere; wherein a brush is centrally mounted in the spindle and bears against the plate, the brush being electrically isolated from the spindle; wherein electrically operated indica means are located remote from the spindle; and wherein electrical conduit means interconnect the indicia means and the contactor plate.

5. A warning device to indicate the condition of vehicular wheels provided with pneumatic tires; said warning device comprising a housing mounted for rotation with the wheel and provided with an internal cavity, a flexible diaphragm in the housing and extending across the cavity so as to divide it into a chamber and a recess, conduit means interconnecting the tire with the chamber so that the pressure of the air within the chamber is the same as that in the tire, a plug shiftably mounted in the recess and engaging the diaphragm so as to move with flexures of the diaphragm, a coil-type compression spring carried by the housing and being in engagement with the plug at its one end, whereby to exert a force on the diaphragm in opposition to the force exerted on it by the pressurized air in the chamber, an adjusting screw threaded into the housing and engaging the spring at its opposite end so that the force exerted by the spring on the diaphragm can be altered, a pressure-responsive switch carried by the housing and located within the chamber, the switch being in engagement with the diaphragm and operated by movement of the diaphragm, and rodlike means extending from the plug axially through the spring, the rod-like means being shiftably mounted in the adjusting screw for manual manipulation externally of the housing so that a manually induced force can be exerted on the diaphragm in opposition to the force exerted thereon by the pressurized air whereby to actuate the switch.

References Cited

UNITED STATES PATENTS

| | | | |
|---|---|---|---|
| 1,406,937 | 2/1922 | Cronan | 340—227 |
| 2,794,876 | 6/1957 | Phelps | 340—58 |

JOHN W. CALDWELL, *Primary Examiner.*

NEIL C. READ, ALVIN H. WARING, THOMAS B. HABECKER, *Examiners.*